G. H. WILLIAMS.
Apparatus for Stuffing Leather.
No. 153,654. Patented July 28, 1874.
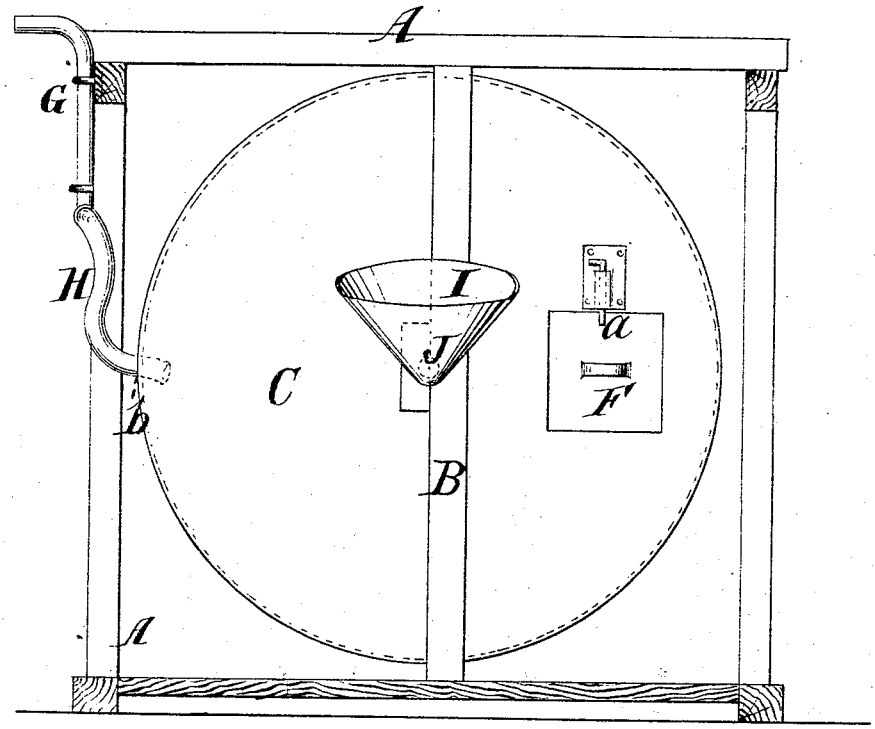
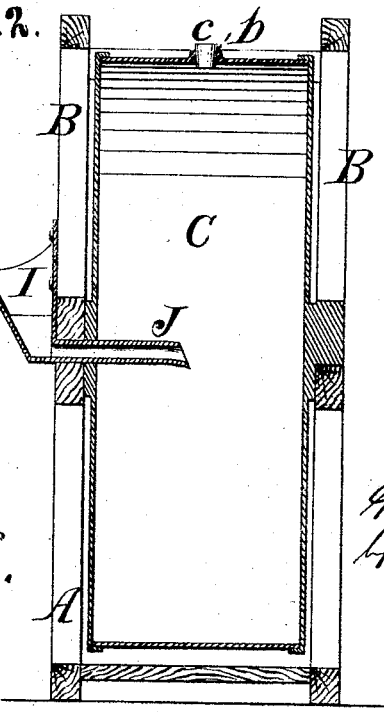
Witnesses.
Inventor.

UNITED STATES PATENT OFFICE.

GEORGE H. WILLIAMS, OF MILWAUKEE, WISCONSIN.

IMPROVEMENT IN APPARATUS FOR STUFFING LEATHER.

Specification forming part of Letters Patent No. 153,654, dated July 28, 1874; application filed February 19, 1874.

*To all whom it may concern:*

Be it known that I, GEORGE H. WILLIAMS, of Milwaukee, in the county of Milwaukee and State of Wisconsin, have invented a new and Improved Apparatus for Stuffing Leather; and I do hereby declare the following to be a full, clear, and exact description thereof, which will enable those skilled in the art to make and use the same, reference being had to the accompanying drawing, forming part of this specification, in which drawing—

Figure 1 represents a side elevation of this invention. Fig. 2 is a transverse central section of the same.

Similar letters indicate corresponding parts.

This invention relates to certain improvements in drums or wheels employed for preparing or stuffing leather; and it consists of a stuffing wheel or drum provided with an opening in its periphery to receive a flexible pipe adapted to a steam-pipe for heating the drum or wheel, as hereinafter described.

In the drawing, the letter A designates a frame, which is provided with standards B B, forming the bearings or journals for the gudgeons of a drum or "stuffing-wheel," C. This wheel receives a rotary motion through a pulley. E, or by any other suitable means, and is furnished with a door, F, which is held shut by a bolt, a, or in any other convenient manner. G designates a pipe, which is supported on the frame A, and is connected at one end with a generator of steam or heated air, and at its other end with the stuffing-wheel C.

The connection of this pipe G with said wheel is effected by means of a detachable joint, H, which is composed, in this example, of a piece of rubber or other flexible hose inserted in an aperture, b, in the circumference or any other convenient portion of the wheel.

In the front of the stuffing-wheel C, on the frame A, is a tank or reservoir, I, which leads, by a pipe or conduit, J, to within the wheel, this pipe being passed through one of the bearings or gudgeons of said wheel, which is hollowed for the purpose.

The stuffing-wheel C is heated by means of steam or hot air, which is let into the same through the pipe G and its connection H, and when said wheel has reached or attained a proper degree of heat this pipe G is disconnected, letting out the products of condensation through the aperture b, vacated by the connection H, which aperture is then closed up by a plug, c, Fig. 2, or by any other suitable means.

By reason of this detachable connection of the heating-pipe the wheel is kept free of all steam or moisture during the ensuing process of stuffing.

By using a permanent connection, as heretofore, the steam employed for heating is liable to get into the stuffing-drum through leakage of the valves, even when the latter are closed, thereby moistening or wetting the leather, the effect of which is to impede, if not prevent, the absorption of the grease or oil.

The leather is now introduced to the stuffing-wheel through the door F, and the wheel set in motion. Simultaneously therewith melted grease or oil is let in through the pipe or conduit J of the tank or reservoir. Said pipe terminates at or near the middle of the drum, and consequently empties the grease directly into the midst of the leather, when, by the motion of the rotating drum, the grease is dispersed uniformly throughout the whole mass of leather.

The heated and melted grease cools to a certain extent in its passage through the conduit J by reason of which, together with the uniform distribution of said grease, the good quality or finish of the leather is insured.

By using a closed cylinder having an opening therein, I am enabled to introduce steam or hot air directly into the interior, and thus dispense with all jackets or outside casings.

What I claim as new, and desire to secure by Letters Patent, is—

A closed cylinder for stuffing leather, provided with the hole b, for introducing steam or hot air, and with a reservoir or tank, J, all constructed as and for the purpose specified.

This specification signed by me this 28th day of January, 1874.

GEORGE H. WILLIAMS.

Witnesses:
G. BOTSAL,
C. LANDSEN.